United States Patent
Wall et al.

(10) Patent No.: US 11,810,121 B2
(45) Date of Patent: Nov. 7, 2023

(54) SYSTEMS AND METHODS FOR END TO END ENCRYPTION UTILIZING A COMMERCE PLATFORM FOR CARD NOT PRESENT TRANSACTIONS

(71) Applicant: Stripe, Inc., San Francisco, CA (US)

(72) Inventors: Jonathan Wall, San Francisco, CA (US); Ross Favero, Oakland, CA (US); Gautam Seshan Raj, Sunyvale, CA (US); Eric Glass, Denver, CO (US)

(73) Assignee: STRIPE, INC., San Francisco, CA (US)

( * ) Notice: Subject to any disclaimer, the term of this patent is extended or adjusted under 35 U.S.C. 154(b) by 413 days.

(21) Appl. No.: 16/523,456

(22) Filed: Jul. 26, 2019

(65) Prior Publication Data
US 2021/0027297 A1 Jan. 28, 2021

(51) Int. Cl.
*G06Q 20/40* (2012.01)
*G06Q 20/38* (2012.01)
*G06Q 20/32* (2012.01)

(52) U.S. Cl.
CPC ....... *G06Q 20/409* (2013.01); *G06Q 20/3829* (2013.01); *G06Q 20/322* (2013.01); *G06Q 2220/00* (2013.01)

(58) Field of Classification Search
CPC ............. G06Q 20/409; G06Q 20/3829; G06Q 20/322; G06Q 2220/00; G06F 8/36
USPC .......................................................... 705/71
See application file for complete search history.

(56) References Cited

U.S. PATENT DOCUMENTS

| 8,584,254 B2 | 11/2013 | Cui et al. |
| 8,631,229 B2 | 1/2014 | Manges |
| 8,897,451 B1 * | 11/2014 | Salvaji ............... G06Q 20/3823 713/167 |
| 8,930,268 B2 | 1/2015 | Nandy |

(Continued)

OTHER PUBLICATIONS

International Search Report and Written Opinion on the Patentability of Application No. PCT/US20/40384, dated Oct. 26, 2020, 27 pages.

(Continued)

*Primary Examiner* — Courtney P Jones
(74) *Attorney, Agent, or Firm* — Womble Bond Dickinson (US) LLP

(57) ABSTRACT

A method and apparatus for processing a transaction between a merchant system and a customer system, the customer system associated with a customer of the merchant are described. The method may include receiving, at a commerce platform, a transaction request from the merchant system, wherein the transaction request is generated by the merchant system and comprises a card identifier and encrypted payment card data, wherein the card identifier is determined from card data for a payment card used in the transaction and the encrypted payment card data comprises at least an encryption of a payment account number. The method may also include decrypting, by the commerce platform, the encrypted payment card data using an encryption key selected based on the card identifier, the encryption key associated with the commerce platform. Furthermore, the method may include authorizing, by the commerce platform in communication with one or more authorization systems, the transaction using the decrypted payment card data.

27 Claims, 6 Drawing Sheets

(56) References Cited

U.S. PATENT DOCUMENTS

| | | | |
|---|---|---|---|
| 9,825,920 B1* | 11/2017 | Yung | H04L 9/0822 |
| 9,830,596 B2 | 11/2017 | Collison et al. | |
| 2010/0257612 A1* | 10/2010 | McGuire | G06Q 20/383 |
| | | | 726/26 |
| 2010/0318468 A1 | 12/2010 | Carr et al. | |
| 2012/0143770 A1 | 6/2012 | Pauker et al. | |
| 2014/0012762 A1* | 1/2014 | Glatt | G07F 7/088 |
| | | | 705/41 |
| 2014/0052642 A1 | 2/2014 | Spies et al. | |
| 2014/0245002 A1* | 8/2014 | Hayward | H04L 63/0428 |
| | | | 713/162 |
| 2014/0372320 A1* | 12/2014 | Goldfarb | G07F 7/1033 |
| | | | 705/72 |
| 2015/0206137 A1 | 7/2015 | Mazarim Fernandes | |
| 2015/0310425 A1* | 10/2015 | Cacioppo | G06Q 20/382 |
| | | | 705/64 |
| 2015/0310431 A1* | 10/2015 | Lakshmanan | G06Q 20/02 |
| | | | 705/71 |
| 2015/0312217 A1* | 10/2015 | Lee | H04L 63/0876 |
| | | | 713/151 |
| 2016/0239835 A1* | 8/2016 | Marsyla | G06Q 20/3829 |
| 2018/0109508 A1* | 4/2018 | Wall | H04L 9/0631 |
| 2018/0144341 A1* | 5/2018 | Kärkkäinen | H04L 9/3263 |
| 2019/0034929 A1* | 1/2019 | Tang | G07F 7/0886 |
| 2019/0068558 A1* | 2/2019 | Jindal | H04L 9/14 |
| 2019/0259026 A1* | 8/2019 | Beye | G06Q 20/208 |

OTHER PUBLICATIONS

International Preliminary Report and Written Opinion on the Patentability of Application No. PCT/US2020/040384 dated Feb. 10, 2022, 15 pages.

* cited by examiner

SYSTEMS AND METHODS FOR END TO END ENCRYPTION UTILIZING A COMMERCE PLATFORM FOR CARD NOT PRESENT TRANSACTIONS

BACKGROUND

Merchants, such as grocers, car services, dry cleaning services, etc., provide their products and services to customers for a fee. To collect fees for products or services provided, a merchant will typically provide a payment interface to customers, such as a payments web page, an application interface (e.g., a mobile device app), a mobile device based payment system, or the like. From the payments interface, customers will provide payment information for the merchant's products or services, such as Europay, Mastercard, Visa, etc. data associated with credit, debit, gift card, electronic benefits, or other payment instruments provided by the customer. In order to collect the card data, the customer will typically enter information, such as card, billing address, expiration date, card identification number, as well as other information appropriate for processing the customer's payment instrument. That card data is then used by the merchant to authorize the transaction, for example using the services of a payment processing system that communicates with banks and/or card providers to approve and charge the fees for the merchant for the transaction. Such a transaction can be referred to as a card not present transaction, as the payment instrument card is not read or scanned by a reader of the merchant at the time of sale.

The card data is then typically provided from the merchant to the payment processing system using a communications network, such as the internet. Certain inefficiencies may be introduced in the communications between the merchant and the payment processing system, such as participation in a number of communications in order to collect card information, track transaction processing, and ultimately process the transaction. Furthermore, such interactions between merchants and payment processing systems may introduce persistent state and/or identification data associated with the card and/or transaction, which introduces security weakness into the handling of sensitive customer information. Furthermore, sensitive customer information may exist in typical transaction processing in plaintext form, and thus is capable of being intercepted by nefarious actors, at several points during the transaction.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
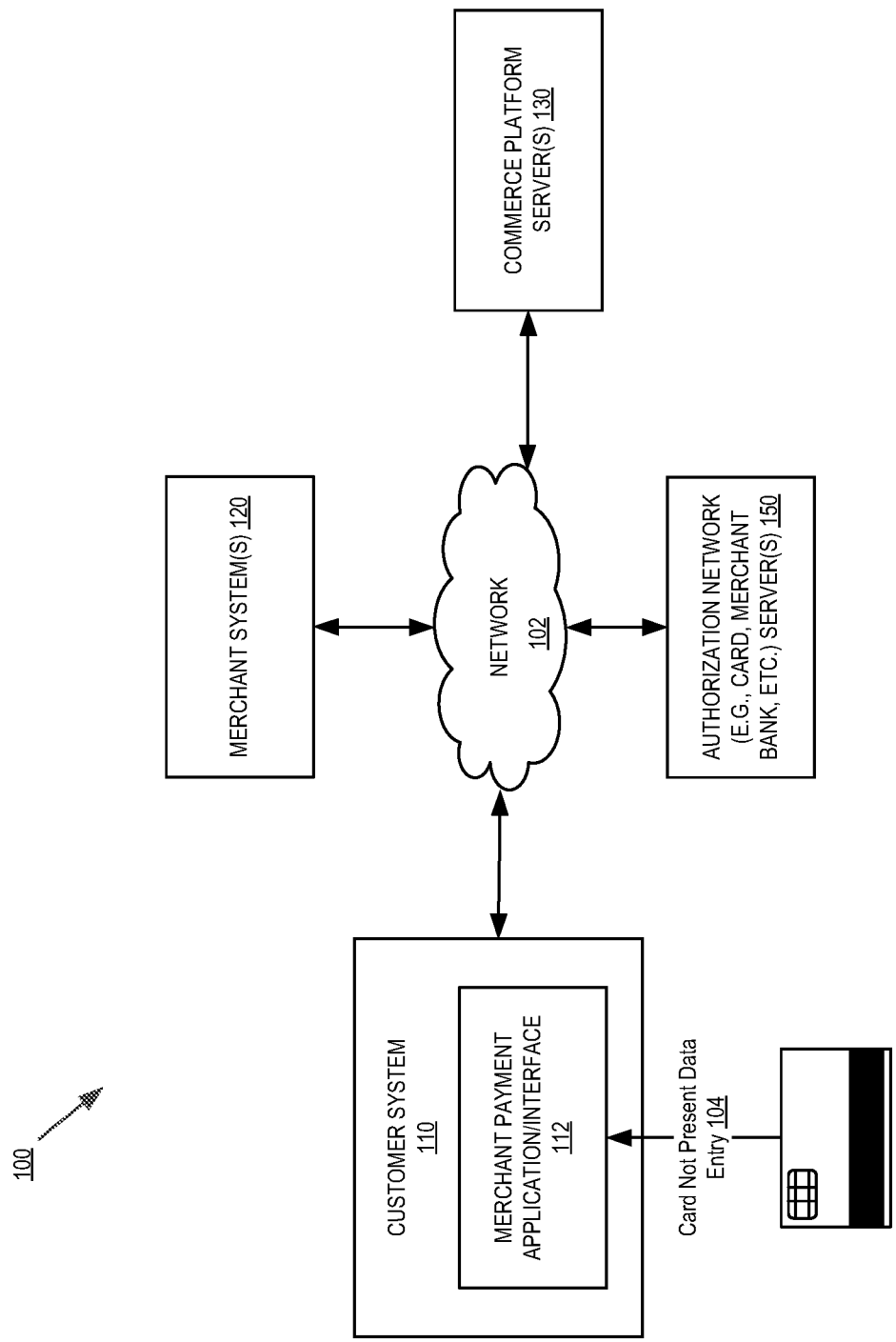
FIG. 1 is a block diagram of an exemplary system for performing encryption when processing card not present transactions by commerce platform server(s) for merchant system(s).

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "decrypting", "encrypting", "returning", "distributing", "storing", "expiring", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system for performing encryption when processing card not present transactions by commerce platform server(s) for merchant system(s). In one embodiment, the system 100 includes a customer system 110, one or more merchant system(s) 120, one or more commerce platform server(s) 130, and one or more authorization network server(s) 150, such as card network systems and merchant bank systems.

In one embodiment, customer system 110 may be configured to implement a payment application and/or provide a merchant payment application interface 112 of a merchant that enables collection of customer payment information for completion of transactions for goods or services offered by the merchant. In embodiments, the application/interface may be a web based application served by one or more of the merchant system(s) 120 where a customer of the merchant enters payment information into a web page, a mobile device application (e.g., an app) where a customer of the merchant can enter payment information for the transaction on the merchant's mobile app, a merchant's payment system (e.g., a kiosk, near field communication system, etc.) that transfers payment information from a customer device to merchant system(s) 120, etc. In embodiments, the customer's payment information is card not present data entry 104 received by the merchant application/interface 112.

In embodiments, the merchant application/interface 112 for collecting payment information of a customer is developed using a software development kit (SDK) distributed by the commerce platform server(s) 130 to merchant system(s) 120 prior to transactions. In embodiments, the SDK distributed by the commerce platform server(s) 130 enables the merchant to develop applications for collecting the card not present payment information 104 during transaction with customers, and further utilizing payment processing services of the commerce platform server(s) 130. Merchant system(s) 120, as well as other systems (e.g., app store system(s) not shown), may then distribute the merchant payment application/interface 112 to customer system 110.

In embodiments, the SDK is a collection of software (e.g., functions, libraries, programming interfaces, etc.) that may be used by the merchant when developing their applications and/or interfaces for collecting customer payment information for card not present transactions, as well as collecting other information and/or during other transactions. As will be discussed in greater detail herein, the SDK based merchant payment application/interface 112 generates deterministic identifiers for the customer's card information in the received card not present data entry 104, encrypts the collected customer payment information upon entry into the merchant payment application/interface 112, insulates customer system 110 from access to the card data thereby removing the customer system 110 from PCI scope, uses tokens that do not include sensitive customer information instead of card information to track transactions between the customer system 110, merchant system(s) 120, and commerce platform server(s) 130, as well as other operations discussed in greater detail herein. Furthermore, the deterministic identifier and payment information encryption is performed early at an application layer of the customer system 110 upon ingestion of the payment information by the SDK based merchant payment application/interface 112 distributed by the merchant system(s) 120 so that the customer card information is not exposed to, accessible by, and does not persist in plaintext form to other applications, hardware, etc. on the customer system 110 or merchant system(s) 120, thereby removing the merchant system(s) 120 and customer system 110 from the scope of PCI compliance. Furthermore, encrypting payment information upon ingestion by the SDK based merchant payment application/interface 112, storage of the payment information in encrypted form at the commerce platform server(s) 130, and decryption by the commerce platform server(s) 130 prior to forwarding card information to authorization network server(s) 150, provides for point-to-point encryption securing the customer's payment information throughout transaction and payment processing.

In embodiments, commerce platform server(s) 130 provide transaction processing of customer's payment information on behalf of the merchant, such as authorizing, clearing, and remunerating merchant system(s) 120 for transactions with customers. In embodiments, and as discussed in greater detail below, commerce platform server(s) 130 receive encrypted customer payment information and one or more card identifiers (e.g., deterministic card identifiers), where the encryption and card identifiers are generated using the SDK based application/interface 112 distributed by the merchant system(s) 120. In embodiments, commerce platform server(s) 130 utilize a distributed architecture of commerce platform servers for taking in customer payment information and processing the payment information using one or more of the authorization network server(s). One embodiment of techniques and systems for a distributed architecture of a commerce platform is described in U.S. patent application Ser. No. 16/523,528, filed on Jul. 26, 2019, titled "ARCHITECTURES, SYSTEMS, AND METHODS FOR CARD BASED TRANSACTIONS," the disclosure of which is incorporated by reference in its entirety. Therefore, in embodiments, commerce platform server(s) 130 may reside on a single server, or be distributed among different servers, coupled to other devices via a public network (e.g., the Internet) or a private network (e.g., LAN). In embodiments, a plurality of commerce platform systems executed by commerce platform server(s) 130 are configured for performing discrete stages of transaction payment processing in response to receiving card data and other data (e.g., user identifiers, PIN numbers, transaction amounts, merchant identifiers, etc.) for a transaction from merchant system(s) 120.

Figure 6:
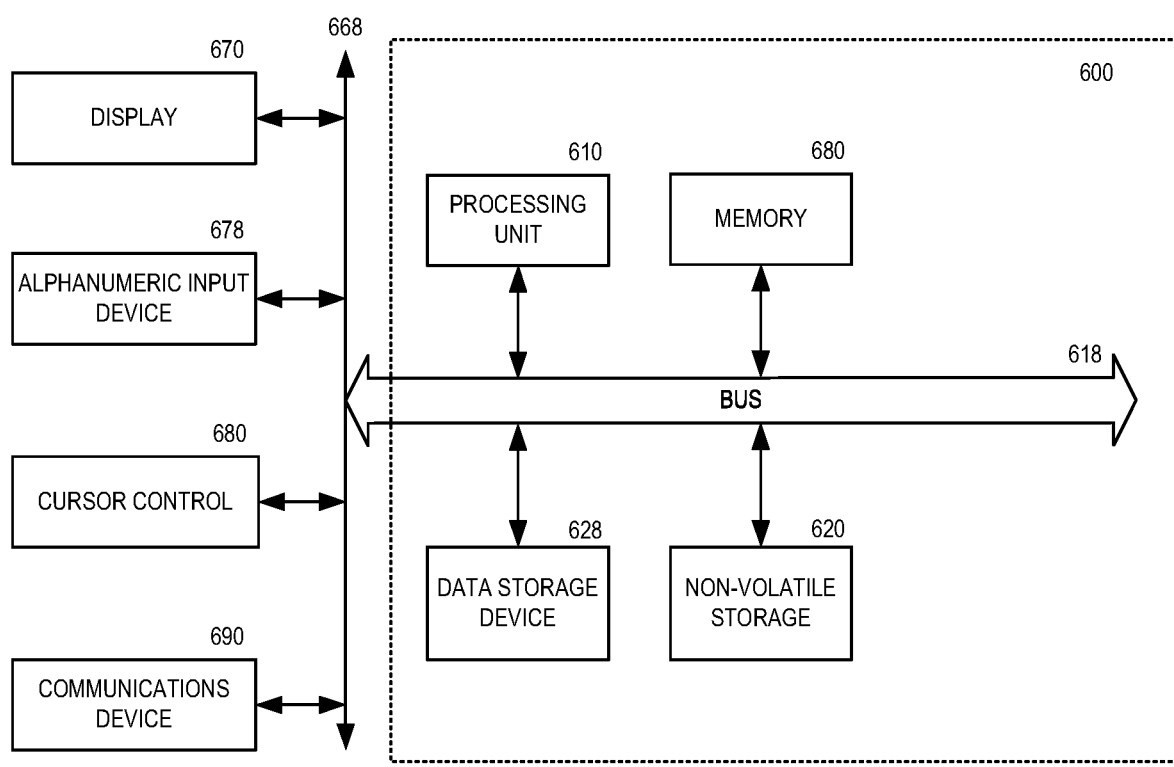
FIG. 6 is one embodiment of a reader device that may be used to support the systems and operations discussed herein.

In embodiments, the customer system 110, merchant system(s) 120, commerce platform server(s) 130, and authorization network server(s) 150 are computing devices, such as one or more server computers, desktop computers, mobile computing devices, or a combination of computing devices, etc. that include typical computing hardware, as illustrated in FIG. 6 below.

The customer system 110, merchant system(s) 120, commerce platform server(s) 130, and authorization network server(s) 150 may be coupled to a network 102 and communicate with one another using any of the standard protocols for the exchange of information. However, due to the sensitive nature of the card data being exchanged during card not present financial transactions, in embodiments, the customer system 110, merchant system(s) 120, commerce platform server(s) 130, and authorization network server(s) 150 may communicate with each other as discussed herein using protocols for the secure exchange of information, such as Transport Layer Security (TLS), Secure Sockets Layer (SSL), Secure Shell (SSH), etc. In embodiments, one or more of the customer system 110, merchant system(s) 120, commerce platform server(s) 130, and authorization network server(s) 150 may run on one Local Area Network (LAN) and may be incorporated into the same physical or logical system, or different physical or logical systems. Alternatively, one or more of the customer system 110, merchant system(s) 120, commerce platform server(s) 130, and authorization network server(s) 150 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

To avoid obscuring the present invention, card not present data is described herein as being collected, encrypted, and processed by merchant payment application/interface. However, in some embodiments, the customer's payment information may be card present data collected from a payment instrument (e.g., a credit card, automatic teller machine card, gift card, etc.) by the customer system 110 via a card reader device (e.g., near field communication (NFC) interface, magnetic strip reader, integrated circuit card (ICC) smart card interface, etc.) communicatively coupled with the merchant payment application/interface 112. That is, although discussed in the context of card not present transactions, the encryption and deterministic identification techniques, information flow, and transaction processing may be utilized for other types of transactions, such as card present transactions.

Figure 2:
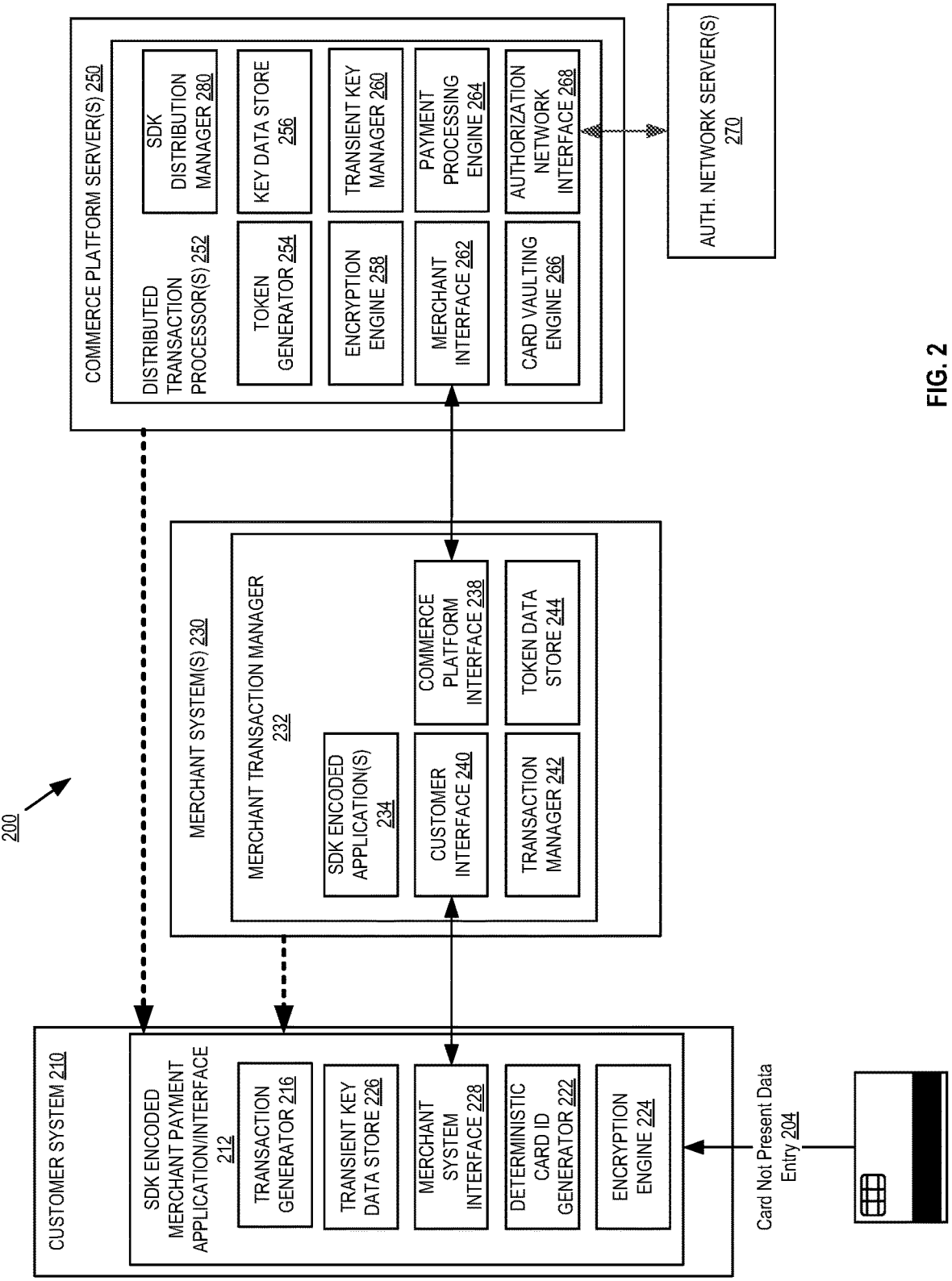
FIG. 2 is a block diagram of one embodiment of a customer system, a merchant system, and commerce platform server(s) that provide card not present transaction processing with end to end encryption of card data during a transaction.

FIG. 2 is a block diagram of one embodiment 200 of a customer system 210, merchant system(s), and commerce platform server(s) 250 that provide card not present transaction processing with end to end encryption of card data during a transaction.

In embodiments, customer system 210 is responsible for collecting customer payment information, such as card not present data entry 204 (e.g., one or more of customer payment card number, CID, expiration date, billing address, name on card, card type, etc.), one behalf of merchant system(s) 230 for goods or services provided by the merchant system(s) 230. However, in order to collect the payment information, customer system 210 (e.g., a computer processing system, such as a mobile device, payment kiosk, etc.) is first provided with SDK encoded merchant payment application/interface 212. In embodiments, the SDK encoded merchant payment application/interface 212 may be a web based interface served by merchant transaction manager 232 of merchant system(s) 230. In another embodiment, SDK encoded merchant payment application/interface 212 is an application, such as a mobile app, distributed by the merchant and which establishes a communications interface with the merchant transaction manager 232 when purchasing the merchant's goods and/or services. In embodiments, SDK encoded merchant payment application/interface 212 may also be used in kiosk computing systems of the merchant, as well as other systems in which card not present data entry 204, as well as card present data, may be received from a customer.

In embodiments, the SDK encoded merchant payment application/interface 212 is developed by merchant system(s) 230 prior to being provided to customer system 210, which can be stored with SDK encoded application(s) 234 in merchant transaction manager 232. In embodiments, merchant system(s) 230 receive a SDK from the SDK distribution manager 280 of commerce platform server(s) 250. In embodiments, the SDK is a collection of software (e.g., functions, libraries, programming interfaces, etc.) that provide for transient key data storage, establishing communications interfaces between customer system 210 and merchant system(s) 230, establishing communications interfaces between merchant system(s) 230 and commerce platform server(s) 250, deterministic card ID generation, and encryption. In embodiments, the functions, libraries, and programming interfaces provided by the SDK for performing the operations discussed herein are used by the merchant to generate the SDK encoded merchant payment application/interface 212.

Furthermore, prior to collecting customer payment information (e.g., card not present data entry 204), the SDK encoded merchant payment application/interface 212 receives one or more encryption keys generated by transient key manager 260 of distributed transaction processor(s) 252 of the commerce platform server(s) 250. The keys may be received directly from commerce platform server(s) 250 or via merchant system(s) 230 (as illustrated by dashed line). The encryption keys received by SDK encoded merchant payment application/interface 212, and stored in transient key data store 226, may include one or more public asymmetric encryption keys associated with private asymmetric encryption keys generated by transient key manager 260 and maintained in key data store 256 at commerce platform server(s) 250. In embodiments, SDK encoded merchant payment application/interface 212 periodically receives updated encryption keys, such as hourly, daily, weekly, etc., to limit the time effectiveness of the encryption keys. Thus, when SDK encoded merchant payment application/interface 212 takes in card not present data entry of a customer of merchant, encryption engine 224 of SDK encoded merchant payment application/interface 212 encrypts the sensitive card data upon ingress at an application layer, which prevents exposure, access, the ability to store, etc. the card not present data entry 204 in unencrypted form by applications and hardware of customer system 210. In embodiments, the encryption includes the encryption engine 224 performing an encryption technique, such as AES 256, utilizing a selected one of the public asymmetric encryption keys stored in transient key data store 226.

Furthermore, upon taking in card not present data 204, non-sensitive card data, such as the primary account number (PAN), is used by deterministic card ID generator 222 of SDK encoded merchant payment application/interface 212 to generate a universal identifier representative of customer payment information. In embodiments, the universal identifier, which is referred to herein as a deterministic identifier for the card is generated such that no card data is revealed from the deterministic identifier, and encryption engine 258 of the distributed transaction processor(s) 252 of commerce platform server(s) 250 can regenerate the deterministic identifier from the non-sensitive card data. Furthermore, the deterministic identifier, which does not reveal sensitive card data, may be used as an identifier for processes, such as tokenization performed by token generator 254, card vaulting engine 266, as well as other processes performed by the distributed transaction processor(s) 252 of commerce platform server(s) 250, discussed in greater detail below.

In one embodiment, deterministic card ID generator 222 utilizes a salt selector to select a cryptographic salt (e.g., random data used as additional input in a one way function, such as a destructive hash function) from a large table of cryptographic salts maintained by deterministic card ID generator 222. The table of cryptographic salts may be pre-generated (e.g., by distributed transaction processor(s) 252). Then, the PAN may be provided as an input to a salt selector function of the deterministic card ID generator 222, such as a function that randomly distributes PANs to the table of salts, for a repeatable selection of a cryptographic salt from the table. Deterministic card ID generator 222 then performs a hashing function using a PAN provided in the card not present data entry 204 and the selected cryptographic salt, for example computing $f_{hash}(PAN, f_{salt}(PAN))$, to generate the deterministic identifier. Although hashing is described above, any one-way function where the input (e.g., the PAN) cannot be regenerated from the output of the function can be used by the deterministic card ID generator 222. Embodiments of techniques for generating and utilizing deterministic card IDs are described in U.S. patent application Ser. No. 16/523,528, filed on Jul. 26. 2019, titled "ARCHITECTURES, SYSTEMS, AND METHODS FOR CARD BASED TRANSACTIONS," the disclosure of which is incorporated by reference in its entirety.

In one embodiment, transaction generator 216 then generates a transaction message for the transaction between the customer and the merchant. For example, the transaction message can define one or more transaction parameters, such as a dollar amount associated with the transaction, a nature of the transaction, what the transaction is directed to (e.g., purchase of one or more item(s), purchase of service(s), or a combination), a time the transaction was initiated, additional parameters (e.g., shipping preferences, tip amount, saving or card information for later use, etc.). The transaction message further includes the encrypted card data generated by encryption engine 224 and the deterministic card ID generated by deterministic card ID generator 222. In embodiments, the transaction message may be an object defined by the SDK. Merchant system interface 228 then communicates the transaction message customer interface 240 of merchant transaction manager 232. Although the sensitive information associated with the transaction is encrypted, and a deterministic ID identifying card information from the card not present data entry 204 cannot be used to obtain sensitive card information, in embodiments, the communications link between merchant system interface 228 and customer interface 240 utilizes techniques for the secure exchange of information, such as TLS, HTTPS, or other secure information exchange techniques.

In embodiments, transaction manager 242 generates a record of the transaction utilizing the deterministic card identifier (e.g., recording the various transaction parameters), and then forwards the transaction message to distributed transaction processor(s) 252. Similar to the discussion above, commerce platform interface 238 utilizes a communications interface with merchant interface 262 of distributed transaction processor(s) 252 that uses techniques for the secure exchange of information, such as TLS, HTTPS, or other secure information exchange techniques.

In embodiments, distributed transaction processor(s) 252 of the commerce platform 252 receive the transaction message including the transaction parameters, encrypted payment information from the card not present data entry 204, and the deterministic card ID. In embodiments, token generator 252 initially generates and returns a token (e.g., a unique identifier that identifies the transaction). In embodiments, the merchant system(s) 230 and the distributed transaction processor(s) 252 utilize the token to reference the transaction initiated by SDK encoded merchant payment application/interface 212 when communicating with one another, such as communication of transaction pre-approval, transaction final approval, remuneration, etc. As a result, no sensitive customer information is exchanged or exposed through the use of the token reference to the transaction. One embodiment of techniques and systems for a tokenizing a transaction is described in U.S. Pat. No. 9,830,596, issued on Nov. 28, 2017, titled "METHOD FOR CONDUCTING A TRANSACTION BETWEEN A MERCHANT SITE AND A CUSTOMER'S ELECTRONIC DEVICE WITHOUT EXPOSING PAYMENT INFORMATION TO A SERVER-SIDE APPLICATION OF THE MERCHANT SITE," the disclosure of which is incorporated by reference in its entirety. The generated token for the transaction is returned to merchant transaction manager 232 for storage in token data store 244. Furthermore, in response to the clearing, approval, etc. of a transaction by distributed transaction processor(s) 252, the clearance, approval, etc. can be communicated to merchant transaction manager 232 with a reference to the token, which in turn enables transaction manager 242 to update the progress of the transaction and/or return status messages (e.g., approval, transaction receipt, etc.) to SDK encoded merchant payment application interface 212.

In embodiments, distributed transaction processor(s) 252 comprise a plurality of distributed instances of transaction processing systems that perform a transaction processing workflow that follows a strict data flow of card not present data during the transaction between the merchant and the customer of the merchant. The strict data flow separates certain operations into stages of transaction processing, such as stages for ingesting new transaction message(s) from the merchant system(s) 230, performing operations including generating pre-authorizations, fraud monitoring, etc., and egressing transaction ISO based transaction messages to authorization network server(s) 270. Furthermore, each of distributed stages may utilize the transaction messages and deterministic identifier to perform their respective transaction operations to minimize and/or eliminate usage of sensitive card data in unprotected form. Additionally, no state data needs be maintained by the distributed stages. In one embodiment, the distributed transaction processor(s) 252 perform transaction processing using a distributed architecture, as described in U.S. patent application Ser. No. 16/523, 528, filed on Jul. 26, 2019, titled "ARCHITECTURES, SYSTEMS, AND METHODS FOR CARD BASED TRANSACTIONS," the disclosure of which is incorporated by reference in its entirety. However, to avoid obscuring embodiments of the present invention, distributed transaction processor(s) 252, and the operations performed in each of the distributed instances of transaction processing, are not shown.

In embodiments, after the token is generated for referencing the transaction between the customer and the merchant, encryption engine 258 may then access the key data store 256 to locate an appropriate key (e.g., based at least on time of originated transaction and the deterministic ID) for decrypting the customer payment information in the initial transaction message. Upon decrypting card data (e.g., a card number, CID, name on card, etc.), payment processing engine 264 then generates a final transaction message for communicating the transaction information to authorization network server(s) 270 (e.g., issuing banks and card issuing servers). In one embodiment, the final transaction message is a PCI compliant message using the ISO 8583 or other secure protocol for the exchange of information during financial transactions. When the transaction is authorized/cleared by the authorization network server(s) 270, distributed transaction processor(s) 252 use the token generated for the initial transaction to indicate to the transaction manager 242 at the merchant system(s) 230 of the clearing/final authorization of the transaction, to provide remuneration to the merchant system(s) 230, etc. Merchant system(s) 230 may in turn provide the status update to the customer system 210.

In embodiments, card vaulting engine 266 of the distributed transaction processor(s) 252 uses the decrypted card data, such as the full card data, card security code, name on card, etc. to populate an entry in a card vault data store (not shown). In embodiments, each entry in the card vault data store is encrypted, and the deterministic identifier (e.g., generated from the PAN) for the card is used to index/access the entries in the encrypted card vault. In embodiments, the vault is utilized by distributed transaction processor(s) 252 to store credit card information to, for example, increase the efficiency of follow on transactions, for later card not present transactions associated with the received card not present data entry 204, etc. Furthermore, in embodiments, the vaulting of card information is performed in response to receipt of authorization from a customer associated with the card information. Additionally, the vaulting of card information may be performed out of band with transaction processing, which increases the timing and efficiency of complete the transaction processing.

In embodiments, the data flow, where sensitive card data is encrypted early at an application layer upon ingestion at the SDK encoded merchant payment application/interface 212, merchant system(s) 230 do not store and are not exposed to sensitive payment information in unencrypted form. Furthermore, techniques discussed herein such as using transient encryption keys, utilization of deterministic identifiers, tokenizing the transaction, etc. ensures that the SDK encoded merchant payment application/interface 212 creates a secure endpoint at customer system 210 for securely taking sensitive customer information. Furthermore, because customer card data (e.g., as received form the card not present data entry 204) is decrypted by commerce platform server(s) 250 for generating PCI compliant final transaction messaging with authorization network server(s) 270, then exposure of sensitive customer information and/or interception by possibly nefarious network elements is minimized. Furthermore, because merchant system(s) 230 reference transactions using the unique tokens generated by commerce platform, and do not store and are not exposed to sensitive customer information in unencrypted form, customer system 210, merchant system(s) 230 and merchant transaction manager 232 are removed from PCI compliance requirements, which removes PCI compliance burdens and reduces development time associated with development and distribution of SDK encoded merchant payment application/interface 212 to customers. Additionally, latency associated with processing of transactions is reduced using the techniques discussed herein because of the controlled and direction flow of information, where multiple communication sessions (e.g., between customer system 210 and commerce platform server(s) 250, as well as between merchant system(s) 230 and commerce platform server(s) 250) are not needed for each transaction.

Figure 3:
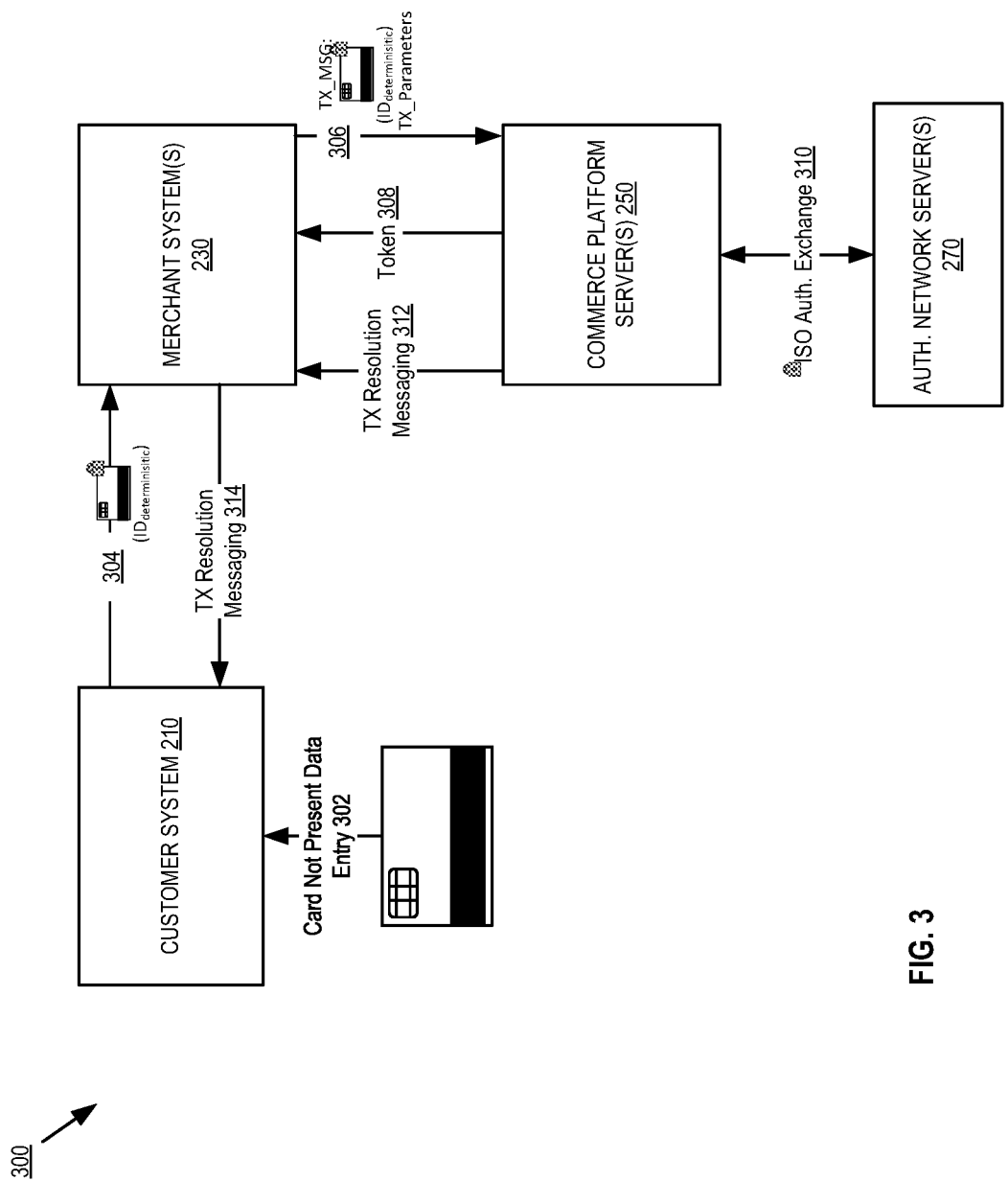
FIG. 3 is a block diagram of one embodiment of processing a card not present transaction between a customer system and merchant system(s), using commerce platform server(s) and authorization network server(s).

FIG. 3 is a block diagram of one embodiment 300 of processing a card not present transaction between a customer system and merchant system(s), using commerce platform server(s) and authorization network server(s) 270. Customer system 210, merchant system(s) 230, commerce platform server(s) 250, and authorization network server(s) 270 utilize processing logic (e.g., software, hardware, firmware, or a combination) to implement the techniques discussed above in FIG. 2.

In embodiments, prior to a transaction customer system 210 obtains and/or installs a merchant system interface/application for completing a transaction, and further receives periodic asymmetric encryption keys (e.g., public keys associated with private keys generated by commerce platform server(s) 250). Then, for a transaction between the customer system 210 and the merchant system(s) 230, such as for purchase of goods or services offered by the merchant, customer system 210 collects card not present data entry 302 from a customer of the merchant. For example, the card not present data includes at least payment information for use during the transaction.

Customer system 210 uses the card not present data entry 302 to generate a deterministic identifier for the payment card, as well as to encrypt sensitive payment card information using a key selected from the periodically received keys (e.g., selected using the deterministic ID, a card PAN, etc.). As discussed herein, the payment information is encrypted at an application layer upon ingestion by the customer system by an SDK encoded merchant application (e.g., application/interface 212) creating secure endpoint of customer system 212.

Merchant system(s) 230 receive this information, and generate a transaction message 306 including the encrypted payment card information, the deterministic card identifier, and one or more transaction parameters (e.g., transaction time, amount, type of card used, etc.). The transaction message 306 is then communicated to commerce platform server(s) 250.

Commerce platform server(s) 250 upon receipt of the transaction message tokenize the transaction by generating a unique token 308 (e.g., a unique transaction identifier) which is returned to the merchant system(s) 230. Furthermore, the deterministic card ID is used by the commerce platform server(s) 250 to select a decryption key in order to obtain the customer's card information when generating PCI compliant ISO authorization exchange messages 310 with authorization network server(s) 270. The ISO authorization exchange messages 310 enable commerce platform server(s) 250 to clear a transaction, amount, etc. with credit agencies, card issuing banks, etc.

Once a decision has been made on the transaction, commerce platform server(s) 250 may generate one or more transaction resolution messages 312 (e.g., authorizations, remunerations, etc.), which are returned to merchant system(s) 230 and reference the transaction using the previously generated token 308. Merchant system 230 may in turn provide transaction resolution messaging to the customer system 210.

As illustrated in FIG. 3, sensitive customer payment card information is protected during communications between the customer system 210, merchant system(s) 230, commerce platform server(s) 250, and authorization network server(s) 270, which may further utilize secure protocols for the exchange of information (e.g., TLS, HTTPS, etc.). Furthermore, the instances in which the sensitive customer payment card information exists in plaintext form is minimized to ingestion at the customer system, where the card information is immediately encrypted and not stored or maintained in unencrypted form, and to decryption for generating PCI compliant ISO authorization messages.

Figure 4:
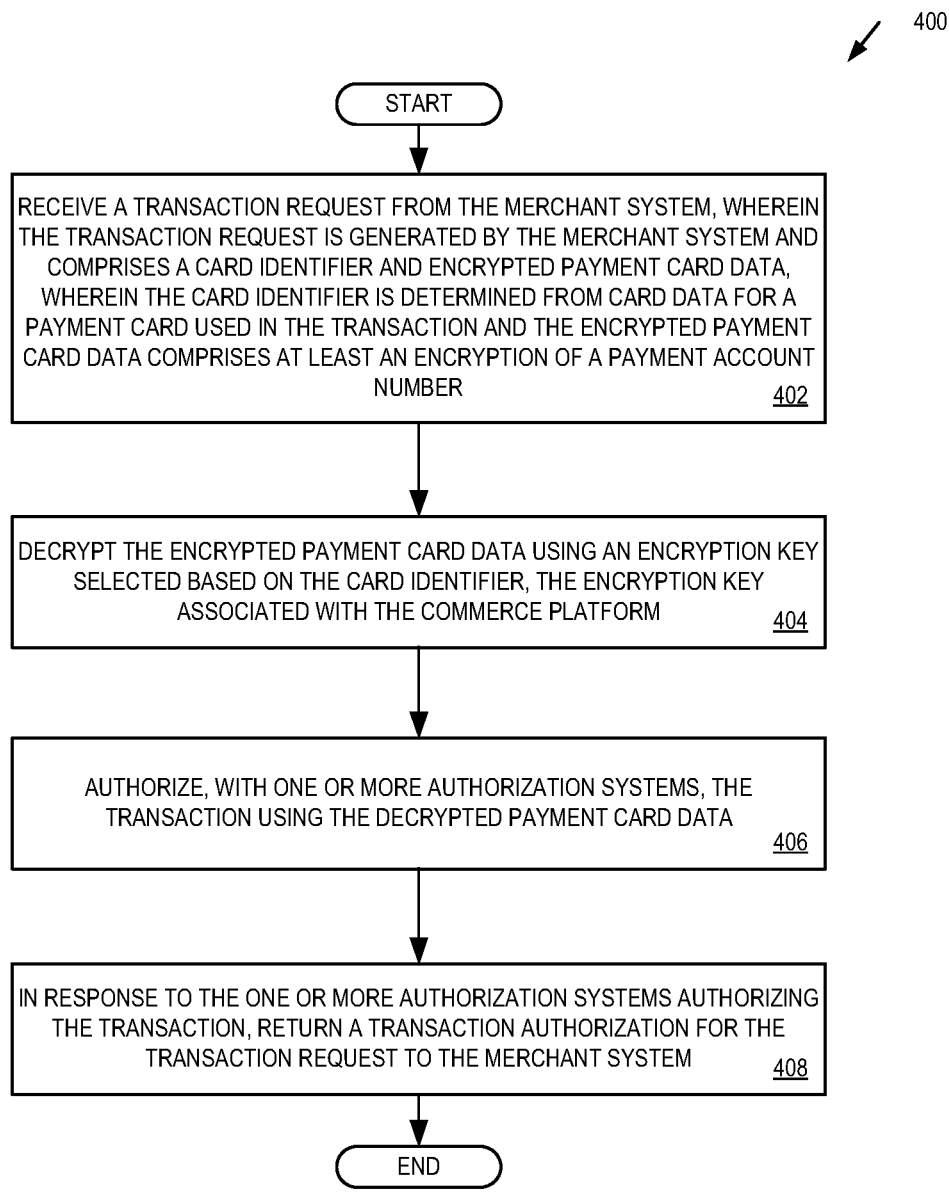
FIG. 4 is one embodiment of a process performed by a commerce platform system for processing a card not present transaction for a merchant.

FIG. 4 is one embodiment of a process 400 performed by a commerce platform for processing a card not present transaction for a merchant. The process 400 is performed by processing logic that may comprise hardware (circuitry, dedicated logic, etc.), software (such as is run on a general-purpose computer system or a dedicated machine), firmware, or a combination thereof. In one embodiment, the process 400 is performed by commerce platform server(s) 130 or 250.

Referring to FIG. 4, processing logic begins by receiving a transaction request from the merchant system, wherein the transaction request is generated by the merchant system and comprises a card identifier and encrypted payment card data, wherein the card identifier is determined from card data for a payment card used in the transaction and the encrypted payment card data comprises at least an encryption of a payment account number (processing block 402). As discussed herein, in embodiments the card identifier is a deterministic card identifier, and the payment card data is encrypted with a transient (e.g., rotating) key associated with a commerce platform.

Processing logic then decrypts the encrypted payment card data using an encryption key selected based on the card identifier, the encryption key associated with the commerce platform (processing block 404). In embodiments, a decryption key may be selected by processing logic based on the card identifier. Processing logic then authorizes, by communication with one or more authorization systems, the transaction using the decrypted payment card data (processing block 406). For example, processing logic may exchange one or more electronic communications, using secure communication channels and/or secure messaging (e.g., ISO compliance), with various systems, including banks server computer systems, credit card issuer server computer systems, fraud agency server computer systems, etc. In embodiments, the communications enable processing logic to determine that the card is authorized to make the transaction for a requested amount associated with the customer/merchant transaction.

In response to the one or more authorization systems authorizing the transaction, processing logic returns a transaction authorization for the transaction request to the merchant system (processing block 408). For example, the authorization message can include one or more authorization codes, acknowledgement from one or more of the financial institutions, transaction identifiers, etc.

Figure 5:
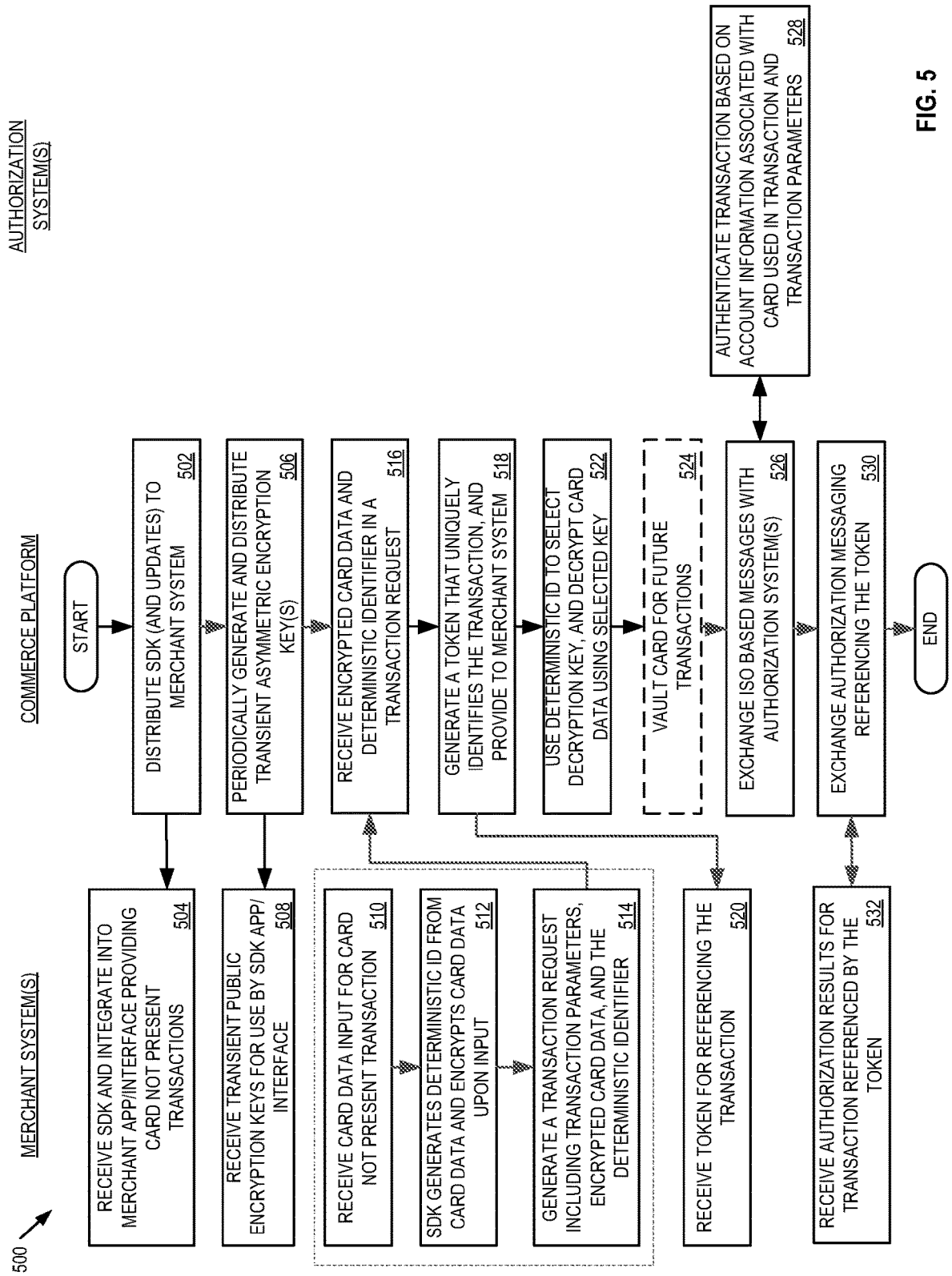
FIG. 5 is one embodiment of a process performed by merchant system(s), a commerce platform, and authorization system(s) for a card not present transaction.

FIG. 5 is one embodiment of a process 500 performed by merchant system(s), a commerce platform, and authorization system(s) for a card not present transaction. The process 500 is performed by processing logic that may comprise hardware (dedicated logic, etc.), software (such as is run on a general-purpose computer system or a dedicated machine), firmware, or a combination thereof. In one embodiment, the process 500 is performed by a merchant system(s) 120 or 230, commerce platform server(s) 130 or 250, and authorization network server(s) 150 or 270.

Referring to FIG. 5, processing logic of the commerce platform begins by distributing an SDK and/or updates to the SDK to a merchant system (processing block 502). As discussed herein, the SDK is a collection of functions, classes, libraries, etc. that enable merchants to build secure and deterministic transaction processing interfaces for customers during card not present transactions. Processing logic of the merchant system(s) receives the SDK and integrates functions of the SDK into a merchant application/interface providing card not present transactions (processing block 504).

Processing logic of the commerce platform then periodically generates and distributes transient asymmetric encryption keys (processing block 506). In embodiments, the keys are transient because they have a limited period of usage/validity, and are expired after that period. Processing logic of the merchant system(s) receives transient public encryption keys for use by the SDK based application/interface (processing block 508). The keys may be stored, along with validity period data, in a key data store.

Processing logic of the merchant system(s) then receives card data input for a card not present transaction (processing block 510). In embodiments, the card data is received from a customer during a transaction via a web based merchant interface, merchant app, merchant kiosk, etc. developed using the SDK distributed by the commerce platform. One or more functions of the SDK generates a deterministic ID from card data and encrypts card data upon input (processing block 512). For example, the one or more functions can include selecting cryptographic salts based on non-sensitive card data (e.g., card PAN numbers), hashing card data, computing functions based on card data and selected cryptographic salts, etc. A transaction request is then generated by processing logic including transaction parameters, such as the encrypted card data and the deterministic ID (processing block 514).

Processing logic of the commerce platform receives the encrypted card data and the deterministic identifier in a transaction request (processing block 516). Processing logic of the commerce platform then generates a token that uniquely identifies the transaction, which is provided to the merchant system (processing block 518). The token may be a random number, a number generated based on transaction parameters, or a combination, and may be used to track and refer to the transaction without having to use card data or customer data to reference the transaction. Processing logic of the merchant system(s) receives the token for referencing the transaction (processing block 520).

Processing logic of the commerce platform uses the deterministic ID to select a decryption key, and decrypts card data using the selected key (processing block 522). In embodiments, the decryption key is selected from an appropriate set of decryption keys, such as those associated with a time period of valid keys, keys from a current set of transient keys, etc. In embodiments, processing logic then optionally vaults the card data (in encrypted form) in a card vault for future use (processing block 524). In embodiments, vaulting is out of band and can be delayed until after processing of the transaction. In embodiments, the out of band card vaulting improves the efficiency of transaction processing by reducing latency introduced into the transaction processing pipeline.

Processing logic of the commerce platform then exchanges ISO based messages with authorization system(s) (processing block 526). Processing logic of the authorization system(s) use the messaging to authenticate the transaction based on account information associated with the card used in the transaction and transaction parameters (processing block 528). Based on the results of the exchange between the commerce platform and the authorization system(s), processing logic of the commerce platform exchanges authorization messaging referencing the token with the merchant system(s) (processing block 530).

Processing logic of the merchant system(s) receives the authorization results for the transaction referenced by the token (processing block 532). In embodiments, receipt of the authorization enables processing logic to conclude the card not present transaction. Furthermore, although not illustrated, additional operations, such as processing loyalty rewards, offering future transaction incentives, requesting authorization for card vaulting for future transactions, etc. may be performed following the completion of the transaction.

FIG. 6 is one embodiment of a computer system that may be used to support the systems and operations discussed herein. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

The embodiments discussed herein may also be embodied in a handheld or portable device containing a subset of the computer hardware components described above. For example, the handheld device may be a mobile telephone, tablet computer, special purpose computer device, etc. configured to contain only the bus, the processor, and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function.

It will be appreciated by those of ordinary skill in the art that any configuration of the system may be used for various purposes according to the particular implementation. The control logic or software implementing the described embodiments can be stored in main memory, mass storage device, or other storage medium locally or remotely accessible to processor.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for a server computer system processing a transaction between a merchant system and a customer system, the customer system associated with a customer of the merchant system, the method comprising:

periodically transmitting, by the server computer system to the merchant system, sets of pluralities of transient public encryption keys that are each associated with a period of validity, where a new set of a plurality of transient encryption keys is transmitted to the merchant system for each new periodic interval;

receiving, at a server computer system, a transaction request from the merchant system, wherein the transaction request is generated by the merchant system and comprises a card identifier, encrypted payment card data, and data indicative of a transaction time, wherein the card identifier is determined from card data for a payment card used in the transaction, the encrypted payment card data comprises at least an encryption of a payment account number generated by the merchant system upon ingestion of the card data by the merchant system, and wherein the merchant system selects a public encryption key from among a plurality of transient public encryption keys of a set of transient public encryption keys to perform the encryption based on the card identifier;
decrypting, by the server computer system, the encrypted payment card data using a private encryption key comprising selecting a set of private encryption keys that correspond to the set of transient public encryption keys from among two or more sets of pluralities of private encryption keys based at least on the transaction time, and in response to selecting the set of private encryption keys, selecting the private encryption key from the selected set of private encryption keys based on the card identifier;
authorizing, by the server computer system in communication with one or more authorization systems, the transaction using the decrypted payment card data; and
in response to the one or more authorization systems authorizing the transaction, the server computer system returning a transaction authorization for the transaction request to the merchant system.

2. The method of claim 1, wherein prior to receiving the transaction request, the method further comprises:
distributing, by the server computer system, a software development kit (SDK) for development of a merchant application that enables card not present transaction processing by the server computer system on behalf of the merchant system using the card data of the customer, wherein the card identifier is generated and the card data is encrypted in an application layer by one or more functions of the SDK upon receipt of the card data by the merchant application preventing merchant system storage and access to the card data in unencrypted form.

3. The method of claim 2, wherein the merchant application comprises one of a web based application distributed over a network by the merchant system or an application executable on a mobile device associated with the merchant.

4. The method of claim 1, wherein the selected private encryption key is known to the server computer system, and wherein the merchant system encrypts payment card data using an asymmetric public encryption key corresponding to the private encryption key.

5. The method of claim 1, wherein prior to receiving the transaction request, the method further comprises:
generating, by the server computer system, first private key public key pairs;
storing, in a key vault of the server computer system, private encryption keys form the first private key public key pairs generated by the server computer system; and
providing, by the server computer system to the merchant system, at least one public encryption key form the first private key public key pairs for merchant system use during card not present transactions with customers.

6. The method of claim 5, further comprising:
periodically generating second private key public key pairs;
storing private keys from the generated second private key public key pairs in the key vault of the server computer system;
distributing one or more public encryption keys form the generated second private key public key pairs to the merchant system; and
expiring one or more private keys from first private key public key pairs generated prior the second private key public key pairs.

7. The method of claim 1, wherein the card identifier is a deterministic identifier generated by the merchant system to identify the payment card used for the transaction with the customer.

8. The method of claim 7, further comprising:
distributing, by the server computer system to the merchant system, a set of cryptographic salts for use by a SDK during card not present transactions with customers; and
receiving the deterministic identifier as the card identifier, wherein the deterministic identifier is generated by the SDK executing within a merchant application during a card not present transaction by the SDK: selecting a cryptographic salt from the set of cryptographic salts based on the card data, and performing at least one hashing function on the selected cryptographic salt and the card data to obtain the deterministic identifier.

9. The method of claim 1, further comprising:
in response to the receipt of the transaction request from the merchant system, the server computer system generating a token, wherein the token comprises a unique identifier for the transaction associated with the transaction request;
providing, by the server computer system to the merchant system, the token prior to performing the authorization; and
returning the transaction authorization for the transaction request to the merchant system by reference to the token.

10. The method of claim 1, wherein communications exchanged between the merchant system and the server computer system are secured using encrypted communications links.

11. The method of claim 1, further comprising:
storing, in an entry of a card vault data store of the server computer system, an encrypted version of the payment card data after the authorization systems authorizes the transaction, wherein the entry of the card vault data store is indexed by the card ID received with the transaction request, and encryption of the payment card data and storage of the encrypted version of the payment card data in the card vault data store is performed out of band of the transaction in response to receipt of an authorization of a user associated with the payment card to store the encrypted version of the payment card data.

12. The method of claim 11, further comprising:
using, by the server computer system, card data stored in the card vault data store for a subsequent transaction by: accessing the encrypted version of the payment card data using a received card ID as an index to the entry in the card vault data store, decrypting the encrypted version of the payment card data from the card vault data store, and using decrypted payment card data from the card vault data store to complete the subsequent transaction.

13. A non-transitory computer readable storage medium including instructions that, when executed by a processor, cause the processor to perform operations for a server computer system processing a transaction between a merchant system and a customer system, the customer system associated with a customer of the merchant system, the operations comprising:
periodically transmitting, by the server computer system to the merchant system, sets of pluralities of transient public encryption keys that are each associated with a period of validity, where a new set of a plurality of transient encryption keys is transmitted to the merchant system for each new periodic interval;

receiving, at a server computer system, a transaction request from the merchant system, wherein the transaction request is generated by the merchant system and comprises a card identifier, encrypted payment card data, and data indicative of a transaction time, wherein the card identifier is determined from card data for a payment card used in the transaction, the encrypted payment card data comprises at least an encryption of a payment account number generated by the merchant system upon ingestion of the card data by the merchant system, and wherein the merchant system selects a public encryption key from among a plurality of transient public encryption keys of a set of transient public encryption keys to perform the encryption based on the card identifier;

decrypting, by the server computer system, the encrypted payment card data using a private encryption key comprising selecting a set of private encryption keys that correspond to the set of transient public encryption keys from among two or more sets of pluralities of private encryption keys based at least on the transaction time, and in response to selecting the set of private encryption keys, selecting the private encryption key from the selected set of private encryption keys based on the card identifier;

authorizing, by the server computer system in communication with one or more authorization systems, the transaction using the decrypted payment card data; and in response to the one or more authorization systems authorizing the transaction, the server computer system returning a transaction authorization for the transaction request to the merchant system.

14. The non-transitory computer readable storage medium of claim 13, wherein prior to receiving the transaction request, the operations further comprises:

distributing, by the server computer system, a software development kit (SDK) for development of a merchant application that enables card not present transaction processing by the server computer system on behalf of the merchant system using the card data of the customer, wherein the card identifier is generated and the card data is encrypted in an application layer by one or more functions of the SDK upon receipt of the card data by the merchant application preventing merchant system storage and access to the card data in unencrypted form.

15. The non-transitory computer readable storage medium of claim 14, wherein the merchant application comprises one of a web based application distributed over a network by the merchant system or an application executable on a mobile device associated with the merchant.

16. The non-transitory computer readable storage medium of claim 13, wherein the selected private encryption key is known to the server computer system, and wherein the merchant system encrypts payment card data using an asymmetric public encryption key corresponding to the private encryption key.

17. The non-transitory computer readable storage medium of claim 13, wherein prior to receiving the transaction request, the operations further comprises:

generating, by the server computer system, first private key public key pairs;

storing, in a key vault of the server computer system, private encryption keys form the first private key public key pairs generated by the server computer system; and providing, by the server computer system to the merchant system, at least one public encryption key form the first private key public key pairs for merchant system use during card not present transactions with customers.

18. The non-transitory computer readable storage medium of claim 17, further comprising operations for:

periodically generating second private key public key pairs;

storing private keys from the generated second private key public key pairs in the key vault of the server computer system;

distributing one or more public encryption keys form the generated second private key public key pairs to the merchant system; and expiring one or more private keys from first private key public key pairs generated prior the second private key public key pairs.

19. The non-transitory computer readable storage medium of claim 13, wherein the card identifier is a deterministic identifier generated by the merchant system to identify the payment card used for the transaction with the customer.

20. The non-transitory computer readable storage medium of claim 19, further comprising operations for:

distributing, by the server computer system to the merchant system, a set of cryptographic salts for use by a SDK during card not present transactions with customers; and receiving the deterministic identifier as the card identifier, wherein the deterministic identifier is generated by the SDK executing within a merchant application during a card not present transaction by the SDK: selecting a cryptographic salt from the set of cryptographic salts based on the card data, and performing at least one hashing function on the selected cryptographic salt and the card data to obtain the deterministic identifier.

21. The non-transitory computer readable storage medium of claim 13, further comprising operations for:

in response to the receipt of the transaction request from the merchant system, the server computer system generating a token, wherein the token comprises a unique identifier for the transaction associated with the transaction request;

providing, by the server computer system to the merchant system, the token prior to performing the authorization; and returning the transaction authorization for the transaction request to the merchant system by reference to the token.

22. The non-transitory computer readable storage medium of claim 13, wherein communications exchanged between the merchant system and the server computer system are secured using encrypted communications links.

23. A server computer system, comprising:

a memory; and a processor coupled with the memory configured to:

periodically transmit, to a merchant system, sets of pluralities of transient public encryption keys that are each associated with a period of validity, where a new set of a plurality of transient encryption keys is transmitted to the merchant system for each new periodic interval, receive a transaction request from the merchant system, wherein the transaction request is generated by the merchant system and comprises a card identifier, encrypted payment card data, and data indicative of a transaction time, wherein the card identifier is determined from card data for a payment card used in the transaction, the encrypted payment card data comprises at least an encryption of a payment account number generated by the merchant system upon ingestion of the card data by the merchant system, and wherein the merchant system selects a public encryption key from among a plurality of transient public encryption keys of a set of transient public encryption keys to perform the encryption based on the card identifier, decrypt the encrypted payment card data using a private encryption key comprising selecting a set of private encryption keys that correspond to the set of transient public encryption keys from among two or more sets of pluralities of private encryption keys based at least on the transaction time, and in response to selecting the set of private encryption keys, selecting the private encryption key from the selected set of private encryption keys based on the card identifier, authorize, by communication with one or more authorization systems, the transaction using the decrypted payment card data, and in response to the one or more authorization systems authorizing the transaction, return a transaction authorization for the transaction request to the merchant system.

24. The server computer system of claim 23, wherein prior to receiving the transaction request, the processor further configured to:

distribute a software development kit (SDK) for development of a merchant application that enables card not present transaction processing by the server computer system on behalf of the merchant system using the card data of the customer, wherein the card identifier is generated and the card data is encrypted in an application layer by one or more functions of the SDK upon receipt of the card data by the merchant application preventing merchant system storage and access to the card data in unencrypted form.

25. The server computer system of claim of claim 23, wherein prior to receiving the transaction request, the processor further configured to:

generate first private key public key pairs;

store, in a key vault maintained in the memory, private encryption keys form the first private key public key pairs generated by the server computer system; and provide, to the merchant system, at least one public encryption key form the first private key public key pairs for merchant system use during card not present transactions with customers.

26. The server computer system of claim 23, wherein the card identifier is a deterministic identifier generated by the merchant system to identify the payment card used for the transaction with the customer, and wherein the processor is further configured to:

distribute, to the merchant system, a set of cryptographic salts for use by the SDK during card not present transactions with customers; and receive the deterministic identifier as the card identifier, wherein the deterministic identifier is generated by a SDK executing within the merchant application during a card not present transaction by the SDK: selecting a cryptographic salt from the set of cryptographic salts based on the card data, and performing at least one hashing function on the selected cryptographic salt and the card data to obtain the deterministic identifier.

27. The server computer system of claim 23, further comprising the processor configured to:

in response to the receipt of the transaction request from the merchant system, generate a token, wherein the token comprises a unique identifier for the transaction associated with the transaction request;

provide, to the merchant system, the token prior to performing the authorization; and return the transaction authorization for the transaction request to the merchant system by reference to the token.

* * * * *